(12) United States Patent
Mickol et al.

(10) Patent No.: US 7,572,101 B2
(45) Date of Patent: Aug. 11, 2009

(54) METHODS AND APPARATUS FOR ASSEMBLING ROTATABLE MACHINES

(75) Inventors: John Douglas Mickol, Cincinnati, OH (US); Thomas Richard Henning, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 627 days.

(21) Appl. No.: 11/062,681

(22) Filed: Feb. 22, 2005

(65) Prior Publication Data
US 2006/0188374 A1 Aug. 24, 2006

(51) Int. Cl.
*F01D 5/30* (2006.01)
(52) U.S. Cl. .......................... 416/1; 416/144
(58) Field of Classification Search ............. 416/1
See application file for complete search history.

(56) References Cited

U.S. PATENT DOCUMENTS

| | | | | |
|---|---|---|---|---|
| 4,732,532 | A * | 3/1988 | Schwaller et al. | 415/119 |
| 4,767,272 | A * | 8/1988 | Kildea | 416/144 |
| 5,537,861 | A * | 7/1996 | Seitelman et al. | 700/279 |
| 6,290,466 | B1 * | 9/2001 | Ravenhall et al. | 416/219 R |
| 6,908,285 | B2 * | 6/2005 | Henning et al. | 416/219 R |
| 7,090,464 | B2 * | 8/2006 | Henning et al. | 416/219 R |
| 2004/0013523 | A1 | 1/2004 | Berger et al. | |
| 2004/0202544 | A1 * | 10/2004 | Henning et al. | 416/219 R |
| 2006/0010686 | A1 | 1/2006 | Henning et al. | |

FOREIGN PATENT DOCUMENTS

| | | |
|---|---|---|
| EP | 1467063 A1 | 10/2004 |
| FR | 2873173 | 1/2006 |
| GB | 2416227 A | 1/2006 |
| JP | 01041603 A * | 2/1989 |

OTHER PUBLICATIONS

Search Report; London Patent Office; Reference No. 157193/11311; Application No. GB0602582.9; Dated Jun. 8, 2006; 4 pgs.

* cited by examiner

*Primary Examiner*—Richard Edgar
(74) *Attorney, Agent, or Firm*—William Scott Andes, Esq.; Armstrong Teasdale LLP

(57) ABSTRACT

A method and apparatus for assembling a rotatable machine is provided. The machine includes a first set of blades that extend radially outwardly from a rotor assembly and wherein a second set of blades is available for installation on the rotor assembly. The method includes determining at least one of a moment weight of each blade in the first set of blades and a geometric parameter of each blade in the first set of blades, determining at least one of a moment weight of each blade in the second set of blades and a geometric parameter of each blade in the second set of blades, and determining a mapping order of each blade for the rotor assembly using the moment weight and the geometric parameter of each blade in the first set of blades and the moment weight and the geometric parameter of at least one blade in the second set of blades.

20 Claims, 5 Drawing Sheets

METHODS AND APPARATUS FOR ASSEMBLING ROTATABLE MACHINES

BACKGROUND OF THE INVENTION

This invention relates generally to gas turbine engines and, more particularly, to methods and apparatus for assembling rotatable machines.

Gas turbines are used in different operating environments, such as, to provide propulsion for aircraft and/or to produce power in both land-based and sea-borne power systems. At least some known gas turbine engines include a core engine having, in serial flow arrangement, a fan assembly and a high pressure compressor that compress airflow entering the engine. A combustor ignites a fuel-air mixture that is then channeled through a turbine nozzle assembly towards low pressure and high pressure turbines. The turbines each include a plurality of rotor blades that extract rotational energy from airflow exiting the combustor.

At least some known commercial jet engine fans operate with a relative blade tip Mach number in the transonic regime and may be subject to an operating characteristic known as multiple-pure-tone (MPT), or buzzsaw noise. Such noise may occur if at least some blades are oriented differently relative to other blades extending around the circumference of the fan case. Moreover, such noise may occur if blade-to-blade geometry variations exist within the fan and/or if flowfield disturbances are present upstream from the fan inlet. Such flowfield disturbances may be caused by any number of factors including, but not limited to drain leakage, panel splice leakage, and/or other geometric nonuniformities. As a result, variations may exist within the fan assembly in the amplitude (strength) and/or spacing of the shockwaves originating from those portions of the blades that have sonic or supersonic velocities. Specifically, at axial locations closer to the fan blades, the noise generated due to the shock waves is generally at multiples of the fan shaft per revolution frequency, which is the frequency with which one point on the shaft passes any particular fixed point as it rotates.

Shock waves of different strengths may propagate at different speeds. Accordingly, as a shock wave travels away from the blades, the noise at a blade passing frequency degenerates into a broad spectrum of lower frequency tones as the shock waves merge with each other. Buzzsaw noise may be an issue with passenger annoyance and comfort, and may also exceed preestablished community noise levels.

To facilitate minimizing multiple pure tone noise of the fan during operation, at least some known fan assemblies are assembled in a controlled manner. For example, at least some known fan assemblies are assembled such that each fan blade is mapped into a specific slot in the fan base. Within other known fan assemblies, a moment weight of each fan blade is determined and is used to map each blade into specific fan base slots. However, because some of the blades of a fan may have a geometry, moment weight, or other physical parameter that is so different from the remaining blades, resequencing the blades may not be capable of reducing fan MPT below acceptable limits.

BRIEF DESCRIPTION OF THE INVENTION

In one aspect, a rotor assembly is provided. The rotor assembly includes a disk including a plurality of circumferentially-spaced blade root slots defined therein and a plurality of blades, each blade including a root, a tip, and an airfoil therebetween, each blade positioned within a pre-determined slot based on a blade map wherein the blade map is generated by a computer system configured to receive at least one of a moment weight of each blade in a first set of blades and a geometric parameter of each blade in the first set of blades, receive at least one of a moment weight of each blade in a second set of blades and a geometric parameter of each blade in the second set of blades, and determine a blade map based on the moment weight and the geometric parameter of each blade in the first set of blades and the moment weight and the geometric parameter of at least one blade in the second set of blades.

In another aspect, a computer program embodied on a computer readable medium for determining a blade map for a bladed rotor assembly is provided. The program includes a code segment that receives at least one of a moment weight of each blade in a first set of blades and a geometric parameter of each blade in the first set of blades, receives at least one of a moment weight of each blade in a second set of blades and a geometric parameter of each blade in the second set of blades, and determines a blade map based on the moment weight and the geometric parameter of each blade in the first set of blades and the moment weight and the geometric parameter of at least one blade in the second set of blades.

In yet another aspect, a method of assembling a rotatable machine is provided. The machine includes a first set of blades that extend radially outwardly from a rotor assembly and wherein a second set of blades is available for installation on the rotor assembly. The method includes determining at least one of a moment weight of each blade in the first set of blades and a geometric parameter of each blade in the first set of blades, determining at least one of a moment weight of each blade in the second set of blades and a geometric parameter of each blade in the second set of blades, and determining a mapping order of each blade for the rotor assembly using the moment weight and the geometric parameter of each blade in the first set of blades and the moment weight and the geometric parameter of at least one blade in the second set of blades.

DETAILED DESCRIPTION OF THE INVENTION

Figure 1:
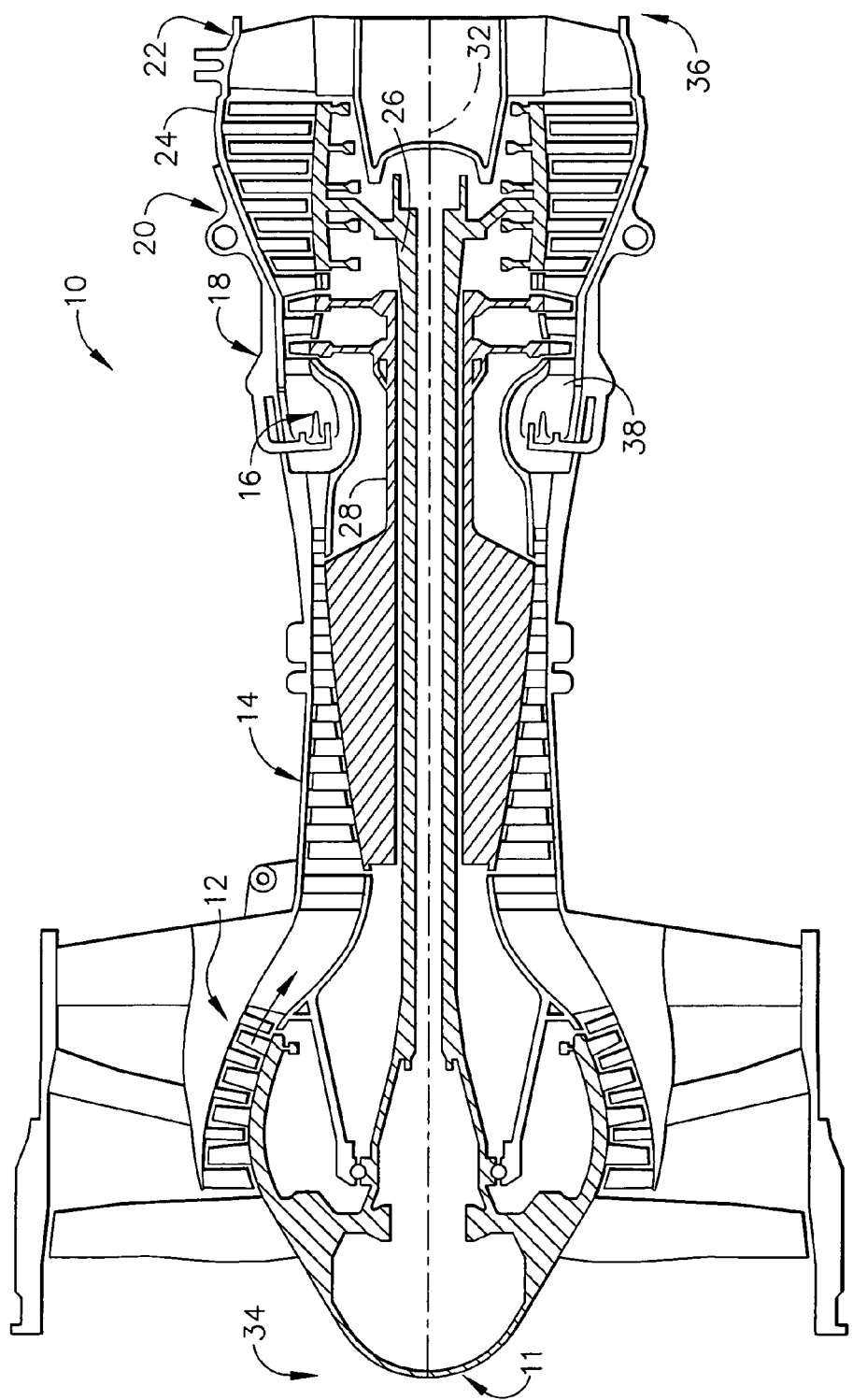
FIG. 1 is a schematic illustration of an exemplary gas turbine engine.

FIG. 1 is a schematic illustration of an exemplary gas turbine engine 10 including a rotor assembly 11 that includes a low-pressure compressor, or fan 12, a high-pressure compressor 14, and a combustor 16. Engine 10 also includes a high-pressure turbine 18, a low-pressure turbine 20, an exhaust frame 22 and a casing 24. A first shaft 26 couples fan 12 and low-pressure turbine 20, and a second shaft 28 couples high-pressure compressor 14 and high-pressure turbine 18. Engine 10 has an axis of symmetry 32 extending from an upstream side 34 of engine 10 aft to a downstream side 36 of engine 10. In one embodiment, gas turbine engine 10 is a GE90 engine commercially available from General Electric Company, Cincinnati, Ohio.

In operation, air flows through fan 12 and compressed air is supplied to high-pressure compressor 14. Highly compressed air is delivered to combustor 16. Combustion gases 38 from combustor 16 propel turbines 18 and 20. High pressure turbine 18 rotates second shaft 28 and high pressure compressor 14, while low pressure turbine 20 rotates first shaft 26 and fan 12 about axis 32.

Figure 2:
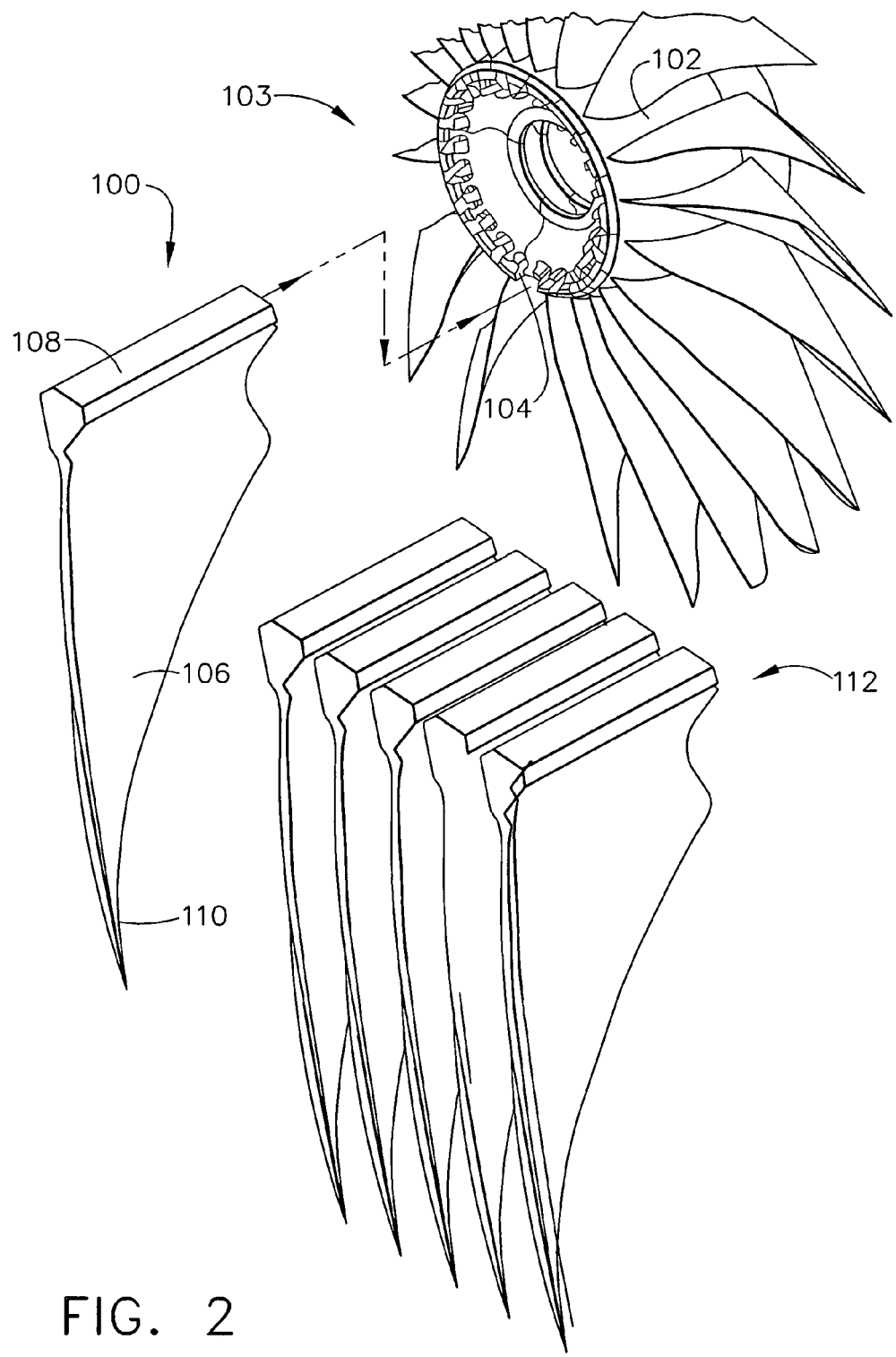
FIG. 2 is a perspective view of an exemplary fan rotor assembly and blading assembly that may be used with the gas turbine engine shown in FIG. 1.

FIG. 2 is an exploded perspective view of an exemplary composite blade 100 and a fan rotor disk 102 that may be used with gas turbine engine 10. A first set 103 of circumferentially-spaced blades 100 are supported by fan rotor disk 102 through a dovetail slot 104. The first set of blades may be a complete row of blades, or, for example, may be a different number of blades, such as, a lesser number of blades than a complete row of blades due to rejection of one or more blades for continued service. Each blade 100 includes an airfoil 106 that extends between a dovetail root 108 and a blade tip 110 such that each blade 100 is supported through dovetail root 108 and dovetail slot 104 by fan rotor disk 102. Blade 100 is representative of a plurality of circumferentially-spaced blades 100 that are each mapped into a specific slot 104 based on measured parameters of blade 100. In the exemplary embodiment, each blade 100 includes a composite airfoil 106 that includes a plurality of layered composite plies (not shown). More specifically, each blade 100 includes a first plurality of structural and load carrying airfoil plies in airfoil 106 and a second plurality of root plies in root 108.

A second set of blades 112 may include spare blades that may be installed on fan rotor disk 102 in place of any of first set of blades 103 or in addition to first set of blades 103. Second set of blades may be, for example, blades that are available because they are salvaged from an engine that has been damaged or otherwise removed from service, from an OEM pool of spare blades allotted to a fleet of engines, from an engine owner's pool of spare blades, or any other available blades that may be used on fan rotor disk 102.

Figure 3:
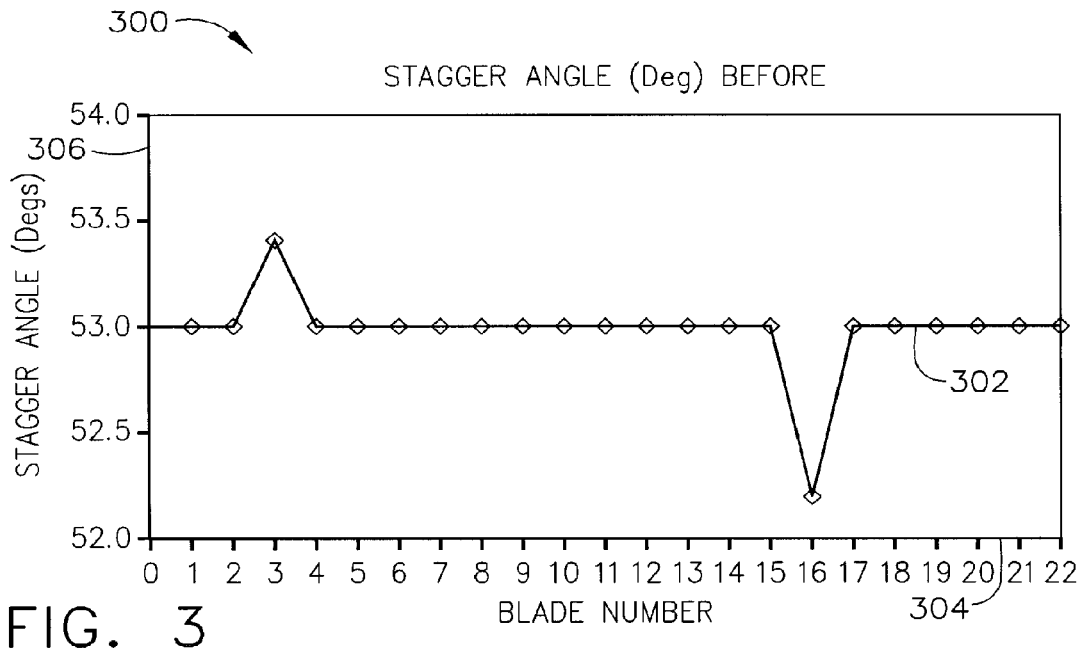
FIG. 3 is a graph of an exemplary trace of a stagger angle for each blade of a first set of blades that may be used with the gas turbine engine shown in FIG. 1.

FIG. 3 is a graph 300 of an exemplary trace 302 of a stagger angle for each blade of a first set 103 of blades that may be used with fan rotor disk 102 (shown in FIG. 1). Graph 300 includes an x-axis 304 that indicates a position for each blade that may be installed on fan rotor disk 102. A y-axis 306 indicates a magnitude of stagger angle for each corresponding blade. In other embodiments, other blade parameters may be measured and the magnitude of each measurement made may be illustrated on graph 300 instead of, or in addition to stagger angle. In the exemplary embodiment, graph 300 illustrates blade #3 and blade #16 having stagger angle magnitudes that are different than the rest of blades 100. It can be seen that simply repositioning blade #3 and/or blade #16 to different locations will not produce a different result with respect to minimizing the blade-to-blade difference of the measured parameter. A second set 112 of blades 100 may be available such that one or more blades in second set 112 have a lesser magnitude measured parameter than blades #3 and/or #16. In such a case, blades from second set 112 may be substituted for the outlier blades #3 and/or #16 to facilitate minimizing the blade-to-blade difference between blades 100 installed on fan rotor disk 102.

Figure 4:
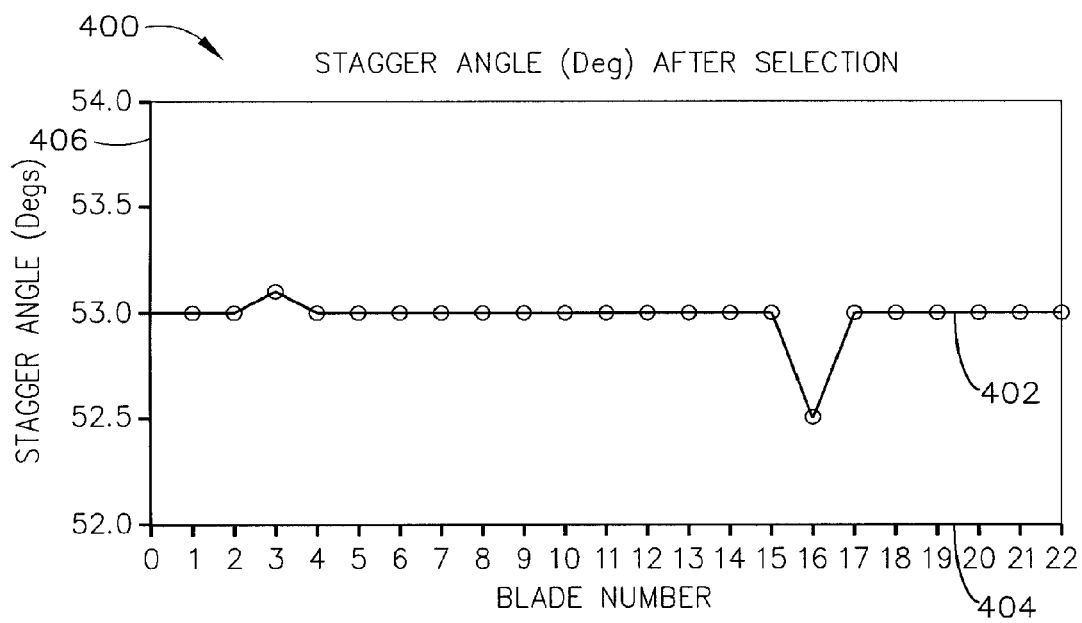
FIG. 4 is a graph of an exemplary trace of a stagger angle for each blade installed on the fan rotor disk shown in FIG. 1.

FIG. 4 is a graph 400 of an exemplary trace 402 of a stagger angle for each blade of a first set 103 of blades that may be used with fan rotor disk 102 (shown in FIG. 1). Graph 400 includes an x-axis 404 that indicates a position for each blade that may be installed on fan rotor disk 102. A y-axis 406 indicates a magnitude of stagger angle for each corresponding blade after mapping blades in first set 103 and blades in second set 112. As shown in FIG. 4, blade #3 has been replaced by a blade from second set 112 having a stagger angle magnitude of approximately 53.1°. Blade #16 is illustrated as having been replaced with a blade from second set 112 having a stagger angle of approximately 52.5°. The reduction in the blade-to-blade stagger angle difference facilitates reducing MPT during operation of fan 12. Similar results are achievable using different measurable blade parameters, such as blade moment weight, pan weight, and blade balance, either alone or in combination with other measurable parameters.

Figure 5:
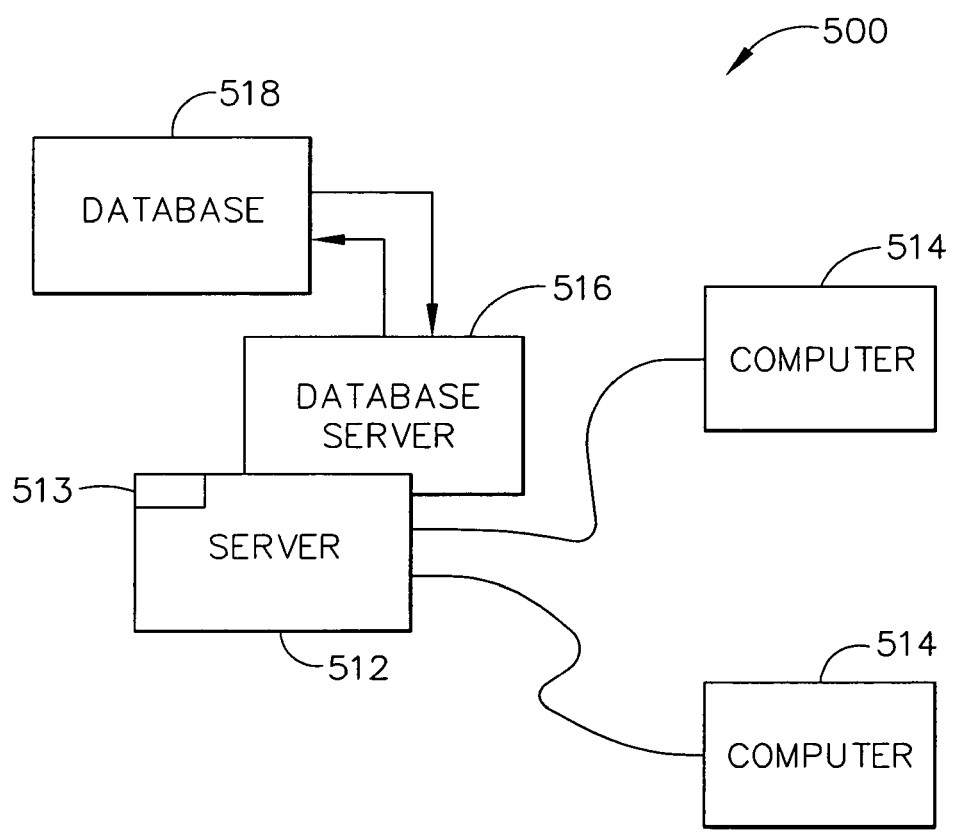
FIG. 5 is a simplified block diagram of an exemplary blade mapping computer system.

FIG. 5 is a simplified block diagram of a blade mapping computer system 500. As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer". Computer system 500 includes a server system 512 including a disk storage unit 513 for data storage, and a plurality of client sub-systems, also referred to as client systems 514, connected to server system 512. In one embodiment, client systems 514 are computers including a web browser, such that server system 512 is accessible to client systems 514 via the Internet. Client systems 514 are interconnected to the Internet through many interfaces including a network, such as a local area network (LAN) or a wide area network (WAN), dial-in-connections, cable modems and special high-speed ISDN lines. Client systems 514 could be any device capable of interconnecting to the Internet including a web-based phone, personal digital assistant (PDA), or other web-based connectable equipment. A database server 516 is connected to a database 518 containing information regarding engine components. In one embodiment, centralized database 518 is stored on server system 512 and can be accessed by potential users at one of client systems 514 by logging onto server system 512 through one of client systems 514. In an alternative embodiment database 518 is stored remotely from server system 512 and may be non-centralized.

Figure 6:
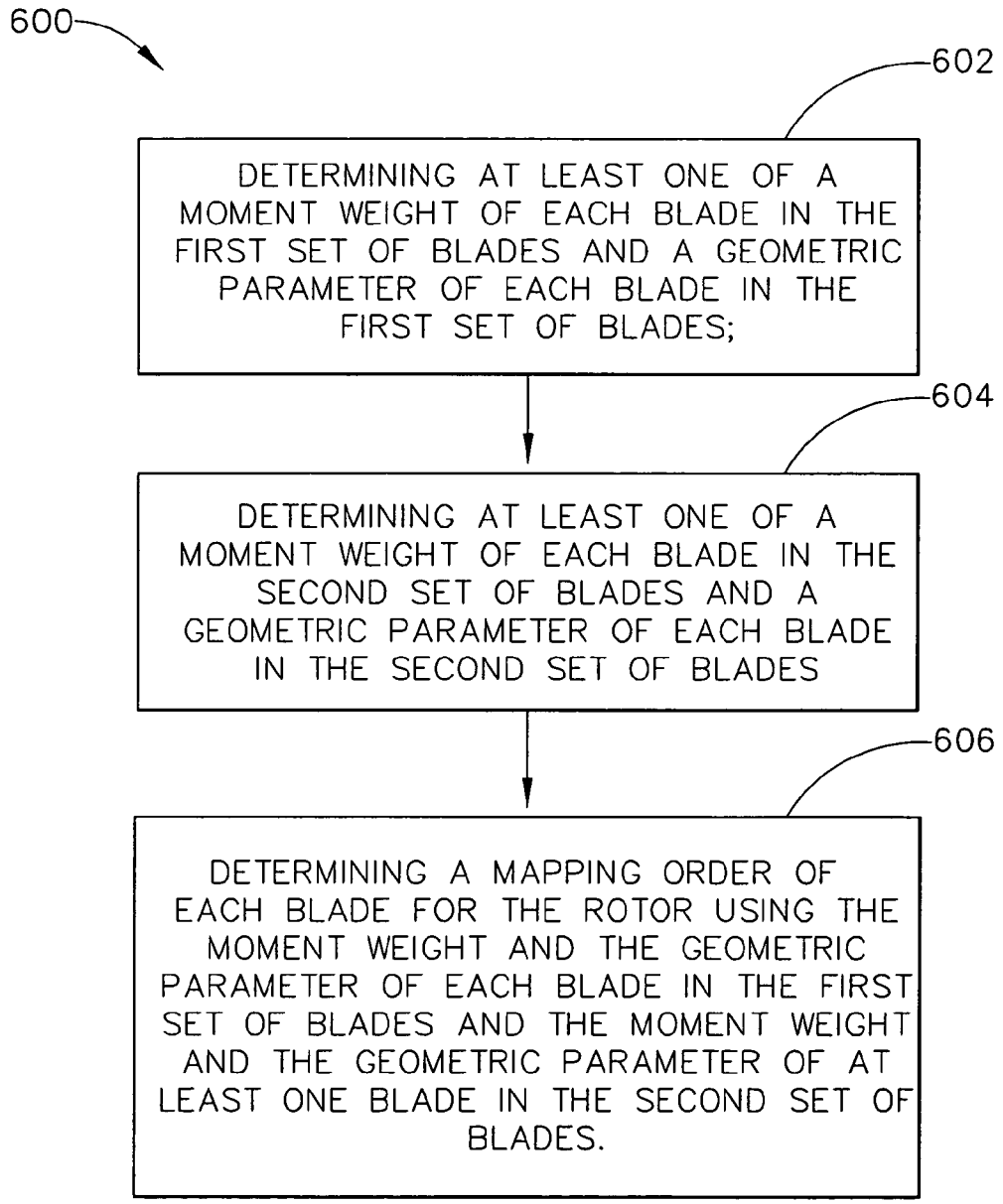
FIG. 6 is a flow diagram of an exemplary method of assembling a rotatable machine, such as the turbine shown in FIG. 1.

FIG. 6 is a flow diagram of an exemplary method 600 for assembling a rotatable machine, such as gas turbine engine 10 (shown in FIG. 1). In the exemplary embodiment, the machine is a gas turbine engine that includes a rotor such as rotor assembly 11, shown in FIG. 1, that is rotatable about a longitudinal axis of symmetry of the engine. The rotor assembly includes circumferentially-spaced slots for receiving the blades such that the blades extend radially between a blade root and a blade tip from the slots. First set 103 of blades 100 may include blades that were previously removed from fan rotor disk 102 and will be reinstalled or may be blades that are newly fabricated or refurbished. Second set of blades 112 may be blades 100 that are available from another source, such a pool of spare blades, or blades salvaged from other engines. Second set 112 of blades 100 may include any number of blades.

Method 600 includes determining 602 at least one of a moment weight of each blade in the first set of blades and a geometric parameter of each blade in the first set of blades. The moment weight may be determined by horizontally supporting a blade by its root in a device designed to measure moment weight. A moment weight is based not only on a pan weight of the blade but, also is based on a distribution of the weight of the blade along a radial distance extending between the blade root to the blade tip. In a rotating machine, an uneven distribution of moment weight of each blade spaced about the rotor assembly may affect a balance condition of the rotor assembly.

Some known rotor assemblies may experience a sudden shift in fan imbalance at high rotational speeds. Depending on the rotor assembly, such a shift may occur at a certain fan corrected speed and may be associated with blade-to-blade airfoil geometry differences and/or aerodynamic balance. Specifically, the sudden shift in fan imbalance at high rotational speeds may adversely affect engine operation. Over time, a vibration caused by such imbalance may prematurely wear components within the engine and cause increased maintenance requirements. To facilitate minimizing imbalance due to the affects of blade-to blade airfoil differences, a measurement of the geometric parameter of each blade to be installed in the rotor assembly also may be determined 602. In the exemplary embodiment, such measurements are made directly during rotor assembly. In an alternative embodiment, the measurements may be made indirectly through the use of measurement devices that include sensors that detect and/or infer parameters of the blade. In another alternative embodiment, measurements of geometric parameters of a blade may be made post-assembly during a test phase.

In addition to determining 602 the moment weight and/or the geometric parameter of each blade in the first set of blades, at least one of a moment weight of each blade in second set 112 of blades and a geometric parameter of each blade in second set 112 of blades is determined 604. Other parameters of the blades in first set 103 and second set 112 may be determined and used to select the blades that are ultimately installed on fan rotor disk 102.

Prior to positioning blades onto fan rotor disk 102, a mapping order is determined 606. A mapping order indicates a specific slot for each blade that will be assembled into the rotor assembly. In the exemplary embodiment, to determine 606 a mapping order, or blade map, a vector sum of the moment weight values and a vector sum of the geometric parameter values of each blade are combined. In the exemplary embodiment, blades are selected and mapped to a rotor slot that facilitates minimizing the vector sums of moment weight and aerodynamic or geometric parameters with each blade being evaluated individually for a particular slot position. In an alternative embodiment, the blades are selected based on the combination of the vector sums to provide offsetting corrections for each pair of blades positioned 180° apart on the rotor disk. Additionally, blades with offsetting aerodynamic or geometric parameters may be positioned adjacent to blades that have complementary aerodynamic or geometric parameters, to facilitate reducing undesirable shifts in balance due to high rotational speeds. Furthermore, aerodynamic or geometric parameters of blades that may aggravate a shift in balance may be positioned farther apart on the rotor disk to facilitate mitigating such effects. To facilitate determining 606 a mapping order, a computer including a program code segment configured to select and deselect blades may be utilized. Specifically, when blades are selected in complementary pairs, a first blade may be selected for positioning in a specific slot based on moment weight and aerodynamic or geometric parameters. A complementary second blade may then be selected for a slot located 180° apart from the first blade. The computer program iteratively selects the available blades in turn and matches them with complementary blades that will be positioned 180° apart from each selected blade. The computer selects blades in an order that facilitates minimizing a combination of the vector sum of the moment weight of all the blades to be positioned on the rotor disk and the vector sum of the geometric parameters of all blades to be positioned on the rotor disk. During the process of minimizing the combination of the vector sums, it may be necessary to deselect blades from blade pairs and reorder the blades selected. The computer system may then display the resultant blade map and generate a report detailing the selection process. Additionally, manual entry of blade parameters and recalculation of the blade map are supported. In other embodiments, a mapping order of each blade for the rotor assembly using the moment weight and the geometric parameter of each blade in the first set of blades and the moment weight and the geometric parameter of at least one blade in the second set of blades is determined 606 using single blades of second set 112 blades to replace blades in first set 103 that have outlying characteristics. The computer implemented method may be iteratively executed to automatically facilitate optimizing the MPT noise and imbalance characteristics of the assembled fan.

In an alternative embodiment, it may be desirable to remove and replace only one blade in the first set of blades rather than to disassemble the rotor assembly and reorder all the blades in the first set of blades. In such a case, the blade map may be generated such that a blade from the second set of blades may be selected to replace the removed blade that facilitates reducing the blade-to-blade difference between the replacement blade and the blades that are adjacent to the replacement blade.

A technical effect of the various embodiments of the invention is to automatically determine a blade map using one or a combination of measurable blade parameters to facilitate minimizing, for example, a rotor assembly imbalance and a MPT of the rotor assembly.

The various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be, but not limited to, a hard disk drive, a solid state drive, and/or a removable storage drive such as a floppy disk drive, or optical disk drive. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer."

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the present invention is described with reference to gas turbine engine rotor assembly, numerous other applications are contemplated. It is contemplated that the present invention may be applied to any bladed rotatable machine, such as, but not limited to a compressor, a blower, a pump, and a turbine.

The above-described blade mapping system is cost-effective and highly reliable means for determining a blade map using more than one blade parameter and a second set of blades to facilitate assembling a rotatable machine. Each system is configured to receive a moment weight value for each blade in a first and second set of blades, receive a geometric parameter value for each blade in a first and second set of blades, calculate a blade location on the rotor assembly based on the received values, and generate a blade map based on the calculated location. Accordingly, the blade mapping system facilitates assembly, operation, and maintenance of machines, and in particular gas turbine engines, in a cost-effective and reliable manner.

Exemplary embodiments of blade mapping system components are described above in detail. The components are not limited to the specific embodiments described herein, but rather, components of each system may be utilized independently and separately from other components described herein. Each blade mapping system component can also be used in combination with other blade mapping system components.

While the invention has been described in terms of various specific embodiments, those skilled in the art will recognize that the invention can be practiced with modification within the spirit and scope of the claims.

What is claimed is:

1. A rotor assembly comprising:
a disk comprising a plurality of circumferentially-spaced blade root slots defined therein; and
a plurality of blades comprising a first set of blades and a second set of blades, wherein at least one blade of the first set of blades comprises a different geometric parameter from the remaining plurality of blades, each of said plurality of blades comprises a root, a tip, and an airfoil extending therebetween, wherein a processor is programmed to:
receive at least one of a moment weight of each blade in the first set of blades and a geometric parameter of each blade in the first set of blades;
receive at least one of a moment weight of each blade in the second set of blades and a geometric parameter of each blade in the second set of blades;
calculate a combined vector sum of the moment weight and the geometric parameter of each blade in the first set of blades and the moment weight and the geometric parameter of at least one blade in the second set of blades; and
determine a blade map based on at least one of the moment weight and the geometric parameter of each blade in the first set of blades, and at least one of the moment weight and the geometric parameter of at least one blade in the second set of blades, the blade map indicating a slot for positioning each of said first set of blades that minimizes a vector sum of a moment weight of said first set of blades:
wherein said first set of blades is positioned within the determined slot based on the determined blade map.

2. A rotor assembly in accordance with claim 1 wherein said processor is further programmed to determine a blade map that replaces a blade in the first set of blades with a blade selected from the second set of blades such that a difference between a geometric parameter of the replacement blade and the geometric parameter of a blade adjacent to the replacement blade in the blade map is facilitated to be reduced.

3. A rotor assembly in accordance with claim 1 wherein each of said plurality of blades are composite fan blades.

4. A rotor assembly in accordance with claim 1 wherein said processor is further programmed to calculate a moment weight vector sum of said rotor assembly using the moment weight value received for each blade positioned within a pre-determined slot.

5. A rotor assembly in accordance with claim 4 wherein said processor is further programmed to facilitate minimizing a moment weight vector sum of said rotor assembly using the moment weight value received for each blade positioned within a pre-determined slot.

6. A rotor assembly in accordance with claim 1 wherein said processor is further programmed to calculate a geometric parameter vector sum of said rotor assembly using the geometric parameter value received for each blade positioned within a pre-determined slot.

7. A rotor assembly in accordance with claim 6 wherein said processor is further programmed to facilitate minimizing a geometric parameter vector sum of said rotor assembly using the geometric parameter value received for each blade positioned within a pre-determined slot.

8. A rotor assembly in accordance with claim 1 wherein said processor is further programmed to determine a blade map for the rotor assembly based on a calculated moment weight vector sum and a calculated geometric parameter vector sum wherein said map indicates a one-to-one correspondence between each said blade and each said slot.

9. A processor comprising a computer readable medium for use in determining a blade map for a bladed rotor assembly, said processor programmed to:
receive at least one of a moment weight of each blade in a first set of blades and a geometric parameter of each blade in the first set of blades;
receive at least one of a moment weight of each blade in a second set of blades and a geometric parameter of each blade in the second set of blades;
calculate a combined vector sum of the moment weight and the geometric parameter of each blade in the first set of blades and the moment weight and the geometric parameter of at least one blade in the second set of blades; and
determine a blade map based on the moment weight and the geometric parameter of each blade in the first set of blades and the moment weight and the geometric parameter of at least one blade in the second set of blades, wherein the blade map indicates a pre-determined slot for each blade that facilitates minimizing a vector sum of a moment weight of the blades coupled to the blade rotor assembly.

10. A processor in accordance with claim 9 further comprising a code segment for use in determining a blade map that replaces a blade in the first set of blades with a blade selected from the second set of blades such that at least one of the difference between the moment weight of the replacement blade and the moment weight of a blade adjacent to the replacement blade in the blade map and the difference between the geometric parameter of the replacement blade and the geometric parameter of a blade adjacent to the replacement blade in the blade map is facilitated being reduced.

11. A processor in accordance with claim 9 further comprising a code segment for use in calculating a moment weight vector sum using the moment weight value received for each blade.

12. A processor in accordance with claim 9 further comprising a code segment for use in calculating a geometric parameter vector sum using the geometric parameter value received for each blade.

13. A processor in accordance with claim 9 further comprising a code segment for use in minimizing a dimensional difference between adjacent blades to be installed on the rotor assembly.

14. A processor in accordance with claim 9 further comprising a code segment for use in generating a blade map that maps each blade into a respective rotor assembly slot to facilitate minimizing a combination of a moment weight vector sum and a geometric parameter vector sum in the rotor assembly.

15. A method of assembling a rotatable machine that includes a first set of blades that extend radially outwardly from a rotor assembly and wherein a second set of blades is available for installation on the rotor assembly, said method comprising:

determining at least one of a moment weight of each blade in the first set of blades and a geometric parameter of each blade in the first set of blades;

determining at least one of a moment weight of each blade in the second set of blades and a geometric parameter of each blade in the second set of blades;

calculating a combined vector sum of the moment weight and the geometric parameter of each blade in the first set of blades and the moment weight and the geometric parameter of at least one blade in the second set of blades; and determining a mapping order of each blade for the rotor assembly using the moment weight and the geometric parameter of each blade in the first set of blades and the moment weight and the geometric parameter of at least one blade in the second set of blades wherein the mapping order indicates a pre-determined slot for each blade that facilitates minimizing a vector sum of a moment weight of blades coupled to the blade rotor assembly.

16. A method in accordance with claim 15 wherein determining a mapping order of each blade for the rotor assembly comprises determining a blade map that replaces a blade in the first set of blades with a blade selected from the second set of blades such that at least one of the difference between the moment weight of the replacement blade and the moment weight of a blade adjacent to the replacement blade in the blade map and the difference between the geometric parameter of the replacement blade and the geometric parameter of a blade adjacent to the replacement blade in the blade map is facilitated being reduced.

17. A method in accordance with claim 15 wherein determining a mapping order comprises determining a moment weight vector sum of the rotor assembly.

18. A method in accordance with claim 15 wherein determining a mapping order comprises determining a geometric parameter vector sum of the rotor assembly.

19. A method in accordance with claim 15 wherein determining a mapping order comprises using a computer to determine a slot position defined within the rotor assembly for each blade that facilitates minimizing a moment weight vector sum, and a geometric parameter vector sum of the rotor assembly.

20. A method in accordance with claim 15 wherein determining a geometric parameter comprises determining an aerodynamic balance of each blade.

* * * * *

UNITED STATES PATENT AND TRADEMARK OFFICE
CERTIFICATE OF CORRECTION

PATENT NO. : 7,572,101 B2 Page 1 of 1
APPLICATION NO. : 11/062681
DATED : August 11, 2009
INVENTOR(S) : Mickol et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 850 days.

Signed and Sealed this

Seventh Day of September, 2010

David J. Kappos
*Director of the United States Patent and Trademark Office*